(12) United States Patent
Weitemeier et al.

(10) Patent No.: US 8,395,407 B2
(45) Date of Patent: Mar. 12, 2013

(54) ELECTRONIC DEVICE AND METHOD FOR TESTING A CIRCUIT BOARD

(75) Inventors: Swen Weitemeier, Loedingsen (DE); Christian Oldendorf, Goettingen (DE)

(73) Assignee: Sartorius Weighing Technology GmbH, Gotteingen (DE)

( * ) Notice: Subject to any disclaimer, the term of this patent is extended or adjusted under 35 U.S.C. 154(b) by 184 days.

(21) Appl. No.: 12/958,869

(22) Filed: Dec. 2, 2010

(65) Prior Publication Data

US 2011/0140731 A1  Jun. 16, 2011

Related U.S. Application Data

(63) Continuation of application No. PCT/EP2009/003785, filed on May 28, 2009.

(30) Foreign Application Priority Data

Jun. 2, 2008  (DE) .......................... 10 2008 026 276

(51) Int. Cl.
*G01R 31/28* (2006.01)

(52) U.S. Cl. ............... 324/763.01; 324/756.07; 361/782; 361/811

(58) Field of Classification Search .................. None
See application file for complete search history.

(56) References Cited

U.S. PATENT DOCUMENTS

| | | | |
|---|---|---|---|
| 5,373,112 A * | 12/1994 | Kamimura et al. ........... | 174/255 |
| 5,588,202 A | 12/1996 | Ehlers et al. | |
| 6,606,252 B1 | 8/2003 | Snider | |
| 6,889,155 B2 * | 5/2005 | Ogino et al. .................. | 702/113 |
| 2005/0117314 A1 | 6/2005 | Lien | |
| 2006/0195705 A1 | 8/2006 | Ehrensvard et al. | |

FOREIGN PATENT DOCUMENTS

| | | |
|---|---|---|
| DE | 3602960 C1 | 2/1987 |
| DE | 4334355 A1 | 4/1995 |
| EP | 0436891 A2 | 7/1991 |
| EP | 1607899 A1 | 12/2005 |
| EP | 1804560 A2 | 7/2007 |
| GB | 2183114 A | 5/1987 |
| JP | 11026747 A | 1/1999 |
| JP | 2002366505 A | 12/2002 |
| JP | 2005156212 A | 6/2005 |
| JP | 2005221398 A | 8/2005 |
| JP | 2008026217 A | 2/2008 |
| WO | 01/06443 A1 | 1/2001 |
| WO | 2009146829 A1 | 12/2009 |
| WO | 2009146830 A1 | 12/2009 |

\* cited by examiner

*Primary Examiner* — Minh N Tang
(74) *Attorney, Agent, or Firm* — Sughrue Mion, PLLC

(57) ABSTRACT

An electronic device, and associated method, provided with a circuit board (10) with a set of input contacts (IN/COM), a set of output contacts (OUT/COM) and an electrical circuit (18) connected between the input contacts (IN/COM) and the output contacts (OUT/COM), and a controller. The controller carries out a real-time test of the circuit board using a test signal introduced into the electrical circuit, the electrical circuit (18) being designed as a passive network having a characteristic transfer function and provided with at least one inductive element, which is formed by a conductor wire (201) wound into a coil around a break (202) in the circuit board (10), which in the assembled condition, is penetrated by a ferromagnetic bar or fixing pin (203), such that the inductance of the inductive element in the assembled state differs from the inductance thereof in the disassembled state.

9 Claims, 2 Drawing Sheets

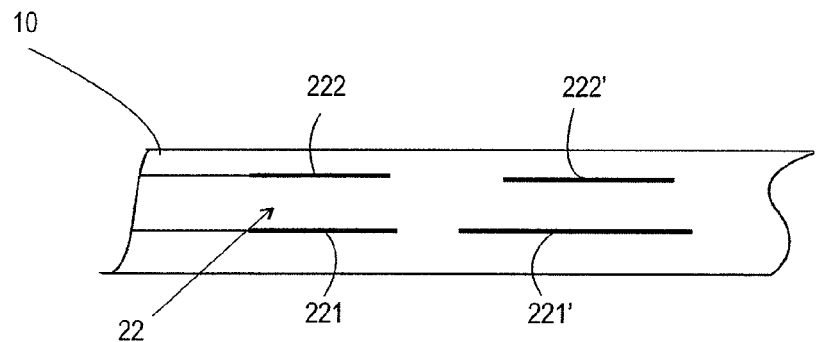
Fig. 2
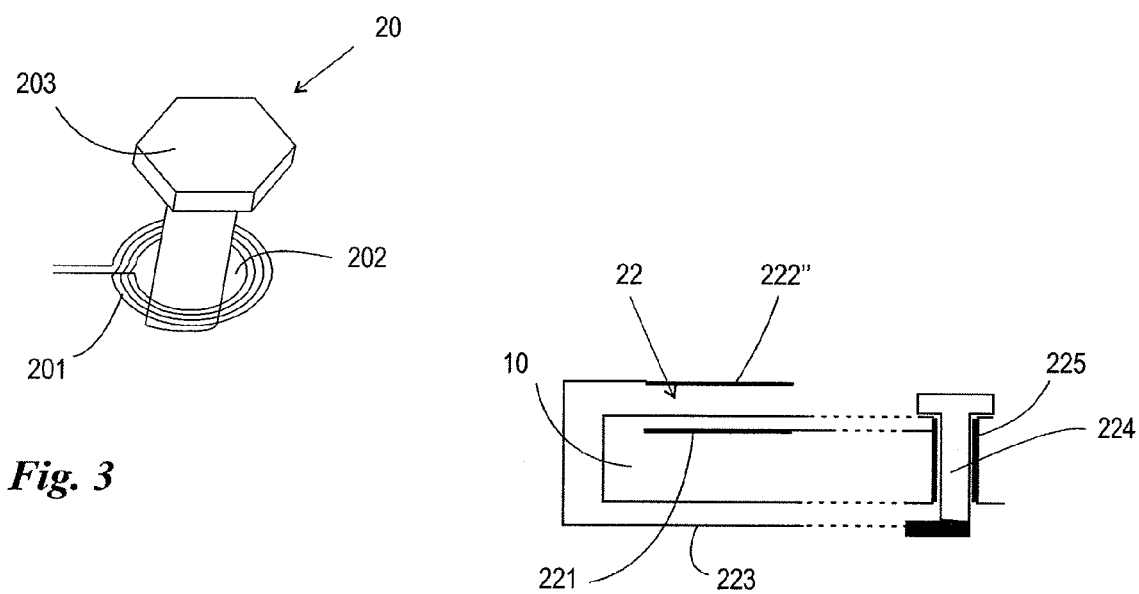
Fig. 3
Fig. 4
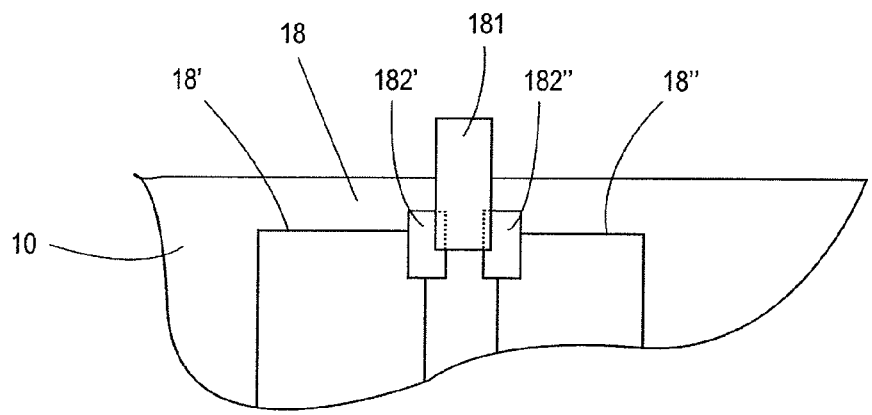
Fig. 5

ELECTRONIC DEVICE AND METHOD FOR TESTING A CIRCUIT BOARD

This is a Continuation of International Application PCT/EP2009/003785, with an international filing date of May 28, 2009, which was published under PCT Article 21(2) in German, and the complete disclosure of which, including amendments, is incorporated into this application by reference.

FIELD AND BACKGROUND OF THE INVENTION

The present invention relates to an electronic device having
a circuit board having a set of input contacts, a set of output contacts and an electrical circuit connected between the input contacts and the output contacts, and
a controller.

The invention also relates to a method for testing a circuit board having a set of input contacts, a set of output contacts and an electrical circuit connected between the input contacts and the output contacts, including:
  a) application of a predetermined test signal to the set of input contacts,
  b) tapping off a response signal at the set of output contacts,
  c) carrying out a signal analysis on the response signal.

Product piracy is growing continuously, including in the field of high-quality electronic devices. The circuit boards of such devices which are equipped with electronic components, in particular, are often easily copied and can be made in low-wage countries at non-competitively cheap prices. The manufacturers of the original devices and the original circuit boards suffer great losses as a result. Industrial property rights often have no effect in these situations, since most circuit boards have a design that is obvious to a person skilled in the art, in view of their special use.

Many original manufacturers counter this trend with an optical marking of their circuit boards that is supposedly difficult to copy, for example, with hologram stickers. Apart from the fundamental possibility of removing stickers, the holograms present a certain impediment to counterfeiters, but they can be copied with sufficient effort or can at least be similarly mimicked to a high level of precision. In any case, protective measures of this type only affect those users who place value on the use of original parts. Users who specifically wish to use cheaper copies are not affected by such a copy-protection system.

In order to copy the electronic function of a circuit board, the visible component set thereof can be adopted. In order to reconstruct the internal wiring, it is known to apply a DC signal to the terminals of the circuit board in pairs and to test the connection of each terminal to all the other terminals and/or to test testing points on the circuit board by means of continuity measurements.

In a more complex method as disclosed in the basis reference JP 11026747 AA, a defined test signal is applied to a pair of input contacts and a resultant output signal is tapped off at a pair of output contacts. It is herein possible that an input contact is identical to an output contact and therefore a total of three test contacts can be used. It is also conceivable, however, that the set of input contacts and/or the set of output contacts includes more than two contacts. However, this variant, which is encompassed by the present invention, is not disclosed in the cited document. On suitable completion of the test and the logical analysis, electronic functions of a possibly component-equipped circuit board can be analyzed and then simulated in a hardware copy or numerically in software. Counterfeits of this type cannot be effectively counteracted through the known copying prevention methods.

In the field of card readers, i.e. devices which read or write information from and/or to IC cards which function as a storage medium and/or as an authorization confirmation, in order to recognize the card standard, it is known to establish and analyze a standardized identification communication between the reading device and active components of the card interface. The aim of the communication is to disclose the respective present interface standard as fully as possible to the reader, in order to enable the reader to select and use the protocols appropriate to the actual interface. Examples of such devices are disclosed in the references WO 01/06443 A1 and EP 1 607 899 B1.

OBJECTS AND SUMMARY OF THE INVENTION

An object of the present invention is to make available a copy protection system for circuit boards that is difficult for counterfeiters to circumvent and is obligatory for all users to use.

In accordance with one formulation of the invention, at least once during operation of an electronic device, the controller
  applies a predetermined test signal to the set of input contacts,
  taps off a response signal at the set of output contacts,
  carries out a signal analysis on the response signal,
  compares a result of the signal analysis with an expected value stored in a memory of the controller, and
  in the event that there is no match between the signal analysis result and the expected value, prevents, at least partially, further operation of the device,
wherein the electrical circuit is configured as a passive network comprising at least one inductively acting element, wherein as the inductively acting element, a conducting wire is looped into a coil around a cut-out in the circuit board which, in the installed condition, is penetrated by a ferromagnetic rod of the electronic device or a ferromagnetic fastening pin, so that the inductance of the inductively acting element is different in the installed condition from its inductance in the uninstalled condition.

Prevention of further operation of the device may include, e.g., deactivation of the device, a blocking of the activation of the device, etc. The prevention may also be contained to a partial prevention, e.g., by deactivating or blocking only certain functions or specific operations. The passive network is characterized by a transfer function that is, e.g., source-specific or even specific to the individual electrical circuit.

In accordance with another formulation of the invention, a controller is provided, which
  carries out the above-mentioned applying, tapping off and analyzing at least once during operation of an electronic device which comprises the circuit board,
  compares the result of the signal analysis with an expected value stored in a memory of the controller, and
  in the event that there is no match between the signal analysis result and the expected value, at least partially prevents, e.g., deactivates or does not activate, further operation of the device,
wherein the electrical circuit is configured as a passive network having a characteristic transfer function, e.g., one that is source-specific or unique to the circuit board itself, and comprising at least one inductively acting element, wherein as the inductively acting element, a conducting wire is looped into a coil around a cut-out in the circuit board which, in the installed condition, is penetrated by a ferromagnetic rod of the electronic device or a ferromagnetic fastening pin, so that the inductance of the inductively acting element is different in the installed condition from its inductance in the uninstalled condition.

According to one aspect, the invention builds into the proper operational sequence of a device which interacts with the copy-protected circuit board and into which the copy-protected circuit board is preferably integrated, a circuit board test procedure which is preferably not noticed by the user. This procedure can be built, for example, into software which controls the operation of the electronic device and which, for instance, is performed on starting up the device or when a program using the circuit board to be tested is called, possibly in the context of an initialization routine. Longer-term test procedures which, for instance, require the device to be put into operation several times, tests at a predetermined or randomly selected time point during operation, or sporadic tests which are not carried out during each operation, but only occasionally, can also be implemented. This makes recognition of the relationship between the use of a counterfeit circuit board and cessation of the device operation more difficult.

Preferably the active element is a microprocessor. A microprocessor of this type is used as a typical core element of a controller of electronic devices. It is connected with its inputs and outputs to the terminals of the circuit board to be controlled by it. It is therefore not difficult to control the microprocessor such that it outputs a predetermined test signal at defined input terminals of the circuit board to be tested and receives a resulting response signal at two outputs. In a particular embodiment of the invention, the controller, in particular the microprocessor is arranged on the circuit board itself.

The typically analog response signal is preferably digitized and is suitably analyzed. A signal suitable for use as the test signal is preferably a pulsed signal or an alternating current signal with a predetermined frequency or an alternating current signal with a sequence of predetermined frequencies. The advantage of the pulsed signal lies in the fact that it takes up only very little time while also containing a plurality of frequencies, so that the response signal represents an impulse response that is typical of the transfer function of the connected electrical circuit. The response signal is analyzed in the controller, i.e. preferably in the microprocessor, according to predetermined parameters. This analysis can involve a spectral analysis of the response signal and/or determination of a phase shift relative to the input signal.

The result of the signal analysis is then compared against an expected value which is stored in a memory of the controller. The concept of the expected value should be understood in a broad sense and encompasses both individual values and groups of individual values, such as phase shifts and spectral distributions. If the result of the signal analysis matches the expected value, i.e. if the circuit board reacts in the expected way, the test is ended as successful and normal operation of the electronic device is continued. The user preferably notices nothing thereof. If, however, the result of the signal analysis should deviate from the expected value significantly, i.e. lies outside specified tolerances, the controller concludes therefrom that the circuit board tested is not an original and at least partially ends the operation of the electronic device. This can be carried out in that any functions running are deactivated, or activation required for further operation is omitted. Ending operation can involve the whole operation of the device or merely some functions, e.g. those specifically performed by components of the suspect circuit board. The possibility of ending operation of only some functions offers itself if completely ending operation would result in safety risks to the user. Partial deactivation or non-activation of operation can also be realized, for example, with delayed—complete or again only partial—deactivation or non-activation.

In order to ensure efficient copy protection, the input and output terminals used for the test should be meaningfully chosen. This is ensured by configuring the electrical circuit on the circuit board as a passive origin-specific or circuit board-specific network with ohmic resistors and capacitively and/or inductively acting elements. Favorably, the electrical circuit used for the test has no other function during operation of the device. With the unique arrangement and dimensioning of simply configured passive elements, such as capacitors, coils and resistors, networks can be constructed which have a highly characteristic transfer function. In addition, elements of this type can be realized on circuit boards without a significant cost. In this way, company-specific or even circuit board-specific identifications can be implemented. The expected value also has to be selected accordingly in the memory of the electronic device. This value can be programmed, for example, at the factory on first equipping of the device with circuit boards. When the device is professionally serviced, including possible exchange of a circuit board, the expected value can be newly programmed in.

In order to improve the copy protection, the components forming the network are preferably "hidden" on the circuit board. This can be achieved in that they are embedded in inner layers of the circuit board. Resistors can be realized in an inconspicuous manner with long, very thin conductor tracks. Capacitors are simply configured as conductor surfaces spaced apart from one another. Based on the widespread technology of "flooding" unused circuit board areas, i.e. the conductor layer is typically allowed to remain in unused circuit board areas, each circuit board has many conductor surfaces, so that optical analysis of the board, for example with X-rays, does not reveal any hidden capacitors.

According to a further aspect of the invention, it is provided that the stored expected value is different from a signal analysis result which comes from carrying out the above-mentioned applying, tapping off and analyzing on an isolated circuit board. In other words, this means that a test carried out on the test circuit board in the installed condition leads to a different signal analysis result (represented in the stored expected value) than the same test carried out with the circuit board separate from the device. This can be achieved in that at least one of the elements of the e.g. origin-specific or circuit board-specific network on the circuit board interacts, in the installed condition in the electronic device, with device components or installation components so that the capacitance value or inductance value or resistance value thereof is different in the installed condition from the capacitance value or inductance value or resistance value thereof in the removed condition. The components designated installation components are those which become active on installation of the circuit boards into the electronic device. These can be, for example, clamping contacts, screws or other fastening bolts/pins, etc. Components designated device components are those which are positioned on the device side and do not primarily serve for the installation of the circuit board. Device components of this type can be positioned, for example, on other circuit boards installed in the device. Possible device components include, for example, conductor surfaces molded into a housing of the device to complete a capacitor, coils to add an inductance, resistors or bridging wires. By this means, components external to the circuit board influence the transfer function of the electrical network. A corresponding expected value is stored in the memory of the controller. A counterfeiter who subjects a circuit board of this type to a complex analytical process would always do so with an isolated circuit board. If he succeeds in creating a counterfeit circuit board which shows identical transfer functions to the original circuit board between all the input and output contact pairs, he still cannot circumvent the test procedure according to the invention, since from the functional analysis, he cannot discover the particular spatial arrangement of all the components of the network, although said arrangement is essential to the interaction with the device-side components and thus to the transfer function of relevance for the test.

According to yet another aspect of the invention, it is provided that as the inductively acting element, a conducting wire is looped into a coil around a cut-out in the circuit board which, in the installed condition, is penetrated by a ferromagnetic rod of the electronic device or by a ferromagnetic fastening pin. This means that the inductance of this coil in the installed condition, i.e. with the ferromagnetic core is markedly different from the inductance thereof in the uninstalled condition. The transfer function of the network changes accordingly.

It can also be provided that, as an additional capacitively acting element, in the installed condition, a conductor surface forms a capacitor together with a corresponding device-side conductor surface which, in the installed condition, is connected via a contact element to the electrical circuit. A counterfeiter analyzing the isolated circuit board would merely identify the board-side conductor surface as an element of high ohmic resistance. In the installed condition, this conductor surface acts capacitively, since it forms a capacitor together with the corresponding device-side conductor surface. The transfer function of the network changes accordingly.

Finally, in an alternative or additionally usable variant, it can be provided that the electrical circuit includes at least two separate partial circuits which, in the installed condition, are connected in electrically conducting manner in the installed condition in the electronic device by interaction with one or more device components and/or installation components. Each attempt at a functional analysis of a circuit board of this type would lead at most to knowledge of the transfer function or impulse response of each individual partial circuit. Only in the installed condition are the two partial circuits linked to a complete network, which has an entirely different transfer function or impulse response, which specifically cannot be represented as a linear combination of the transfer functions or impulse responses of the partial circuits.

One particular advantage associated with the present invention lies therein that a copied circuit board is recognized as such by the device itself, and this leads to cessation of the device operation. Furthermore, even a copy of the circuit board which, in the isolated condition, is functionally identical is not sufficient to circumvent the copy protection system. Rather, spatial details must also be taken into account. But a counterfeiter cannot detect which spatial details are relevant for the copy protection system. He would therefore be forced to copy the circuit board identically in all the spatial details. The effort required for such an analysis, which would require microlayer disassembly of a large area circuit board, exceeds the opportunities and capabilities of typical counterfeiters.

Further features and advantages of the present invention are disclosed in the following detailed description and the drawings.

BRIEF DESCRIPTION OF THE DRAWINGS

In the drawings:

FIG. 2 is a schematic, partial, cross-sectional representation of a circuit board according to the invention, FIG. 3 is a schematic representation of a preferred embodiment of an inductor of a circuit board according to the invention, FIG. 4 is a schematic representation of a preferred embodiment of a capacitor on a circuit board according to the invention, FIG. 5 is a schematic representation of a preferred embodiment of an electrical network assembled from partial networks on a circuit board according to the invention.

DESCRIPTION OF PREFERRED EMBODIMENTS

Figure 1:
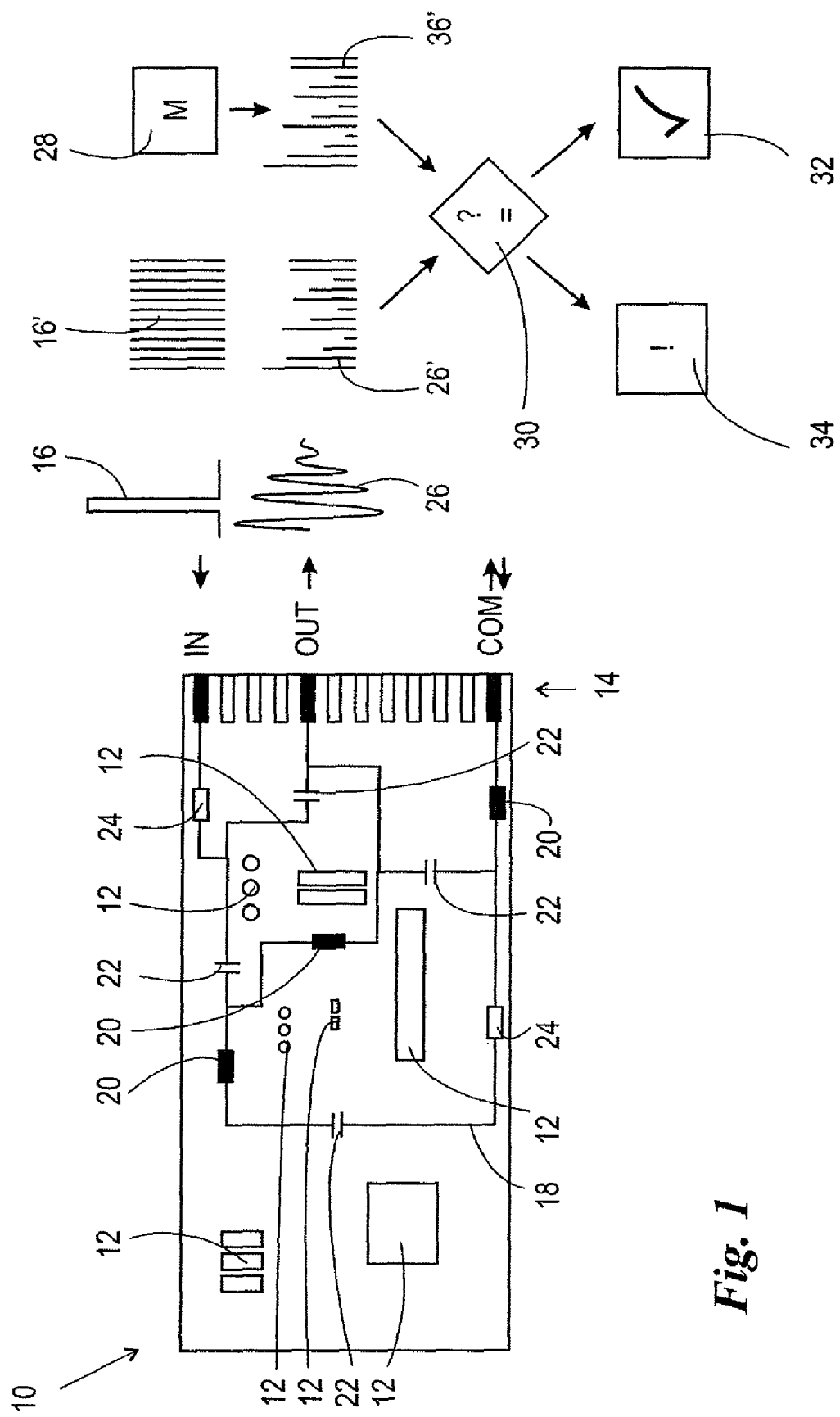
FIG. 1 is a schematic representation of a method according to the invention.

FIG. 1 shows a schematic representation of the copy protection system for circuit boards according to the invention. What is shown, in a highly schematic simplified form, is circuit board 10 with various active components 12 the internal wiring of which is not shown in FIG. 1. The circuit board 10 has a plurality of terminals 14 at which, in the installed condition, the circuit board is contacted by corresponding contacts of an electronic device. Three of the terminals, specifically IN, OUT and COM are particularly emphasized in the figure. The terminal IN has, with the terminal COM, a pair of input terminals for a test signal 16, which is applied at a predetermined time point by a controller (not described in detail) during proper operation of the electronic device (also not described in detail), in which the circuit board 10 is installed. With the embodiment shown, the test signal 16 is a pulsed signal. Alternatively, also preferably, high frequency alternating current signals of a predetermined frequency or a predetermined sequence of frequencies can be fed in. The input terminal pair IN/COM is coupled to a network 18 which includes different passive electrical components. Purely by way of example, in FIG. 1, three inductors 20, four capacitors 22 and two ohmic resistors 24 are shown. The precise number of passive electrical components and their actual values, i.e. capacitances, inductances or ohmic resistances are also, just like their actual arrangement on the circuit board in relation to one another, not relevant to the present invention. Rather, one strength associated with the present invention lies in the almost limitless variability of the configuration possibilities that an origin-specific or even circuit board-specific encoding allow through the network of passive electrical components.

The terminals OUT and COM together form a pair of output terminals at which a response signal 26 of the network 18 can be tapped off. The response signal 26 is dependent on the input signal 16 and the characteristics of the network 18. Purely for illustration, in FIG. 1, a schematic spectrum 16' of the input signal 16 and a spectrum 26' of the output signal 26 are shown. The representation serves only to illustrate that, due to the network 18, a signal applied to the input terminal pair IN/COM experiences a characteristic change which leads to the output signal 26, which is tapped off at the output terminal pair OUT/COM.

The controller carries out an analysis of the output signal 26, involving, for example, a spectral analysis. The result of the analysis is compared (decision block 30) with an expected value which, in the exemplary embodiment shown, is stored as a spectrum 36' in a memory 28 of the controller.

If the signal analysis result, e.g. the spectrum 26', matches the expected value, e.g. the stored spectrum 36' within previously defined tolerances, operation of the electronic device continues as normal (event block 32). If the signal analysis result 26' deviates substantially from the expected value 36', the further operation of the electronic device is at least partially prevented (event block 34).

In order to make copying of the circuit board 10 more difficult, the components of the network 18 are not applied to the circuit board 10 in the obvious manner as shown schematically in FIG. 1. Rather, the components are arranged in a hidden manner.

FIG. 2 shows an example of the hidden arrangement of a capacitor 22, with two conductor surfaces 221, 222, which are embedded in the plastics material of the circuit board 10 which acts as a dielectric. The additional arrangement of further conductor surfaces 221', 222' which themselves are not part of the network 18 contributes to the difficulty of analyzing the circuit board 10. Conductor surfaces 221, 222 of this type not belonging to the network 18 often arise through "flooding" of board areas that are not needed and therefore are made without extra cost during normal circuit board production.

FIG. 3 shows a particularly advantageous embodiment of an inductor 20 as a component of the network 18. The inductor 20 includes a conductor 201, which is looped in the form of a coil around a cut-out 202 in the circuit board. The cut-out 202 serves to be penetrated by a fastening pin 203 with which the circuit board 10 is installed into the electronic device. The fastening pin 203 is preferably made from a ferromagnetic material so that the presence or absence thereof as a coil core makes a significant difference to the inductance value of the inductor 20.

FIG. 4 shows a preferred embodiment of a capacitor 22 of the network 18. The capacitor 22 includes the conductor surfaces 221, 222". A first conductor surface 221 is a component part of the circuit board 10. The second conductor surface 222", however, is a component part of the electronic device into which the circuit board 10 is installed. An electrical connection of the device-side conductor surface 222" to the rest of the network 18 is carried out via a connecting wire 223 which extends within the electronic device and is connected to an electrically conducting fastening pin 224 which, in turn, contacts the rest of the network 18 via an electrically conductively coated cut-out 225 in the circuit board 10. The cut-out 225 is in electrically conducting connection with the rest of the network 18. In this way, it is achieved that the capacitor 22 only acts as a capacitor in the installed condition of the circuit board 10. In the isolated circuit board, it merely represents a region of high ohmic resistance.

FIG. 5 shows a variant of the network 18, which consists of two partial networks 18' and 18". In the installed condition, the partial networks 18' and 18" are connected by means of a clamping contact 181 of the electronic device in which the circuit board 10 is installed, in that the clamping contact 181 contacts, in electrically conducting manner, two contact surfaces 182' and 182" which are respectively components of the partial networks 18', 18". It is thereby achieved that the network 18 provides an entirely different impulse response or transfer function in the installed condition than in the isolated condition.

Naturally, the embodiments discussed in the detailed description and shown in the figures are merely illustrative exemplary embodiments of the present invention. This disclosure leaves open to a person skilled in the art a broad spectrum of variation possibilities. In particular, the precise design of the transfer function or the impulse response of the network 18, which is the result of the actual embodiment and arrangement of the components of the network 18, is essentially freely selectable. The consequences arising from the detection of a non-genuine circuit board using a method according to the invention can be adapted within broad ranges to the requirements of the individual case. In particular, a total cessation of operation of the electronic device, or a partial cessation, which can also comprise prior warning of later total cessation or further partial cessation, can be realized by providing suitable software. The applicant seeks to cover any and all changes and modifications as fall within the spirit and scope of the invention, as defined by the appended claims, and equivalents thereof.

The invention claimed is:

1. An electronic device comprising:
 a circuit board having a set of input contacts, a set of output contacts and an electrical circuit connected between the input contacts and the output contacts, and
 a controller,
 wherein the controller is configured, at least once during operation of the device,
  to apply a predetermined test signal to the set of input contacts,
  to tap off a response signal at the set of output contacts,
  to carry out a signal analysis on the response signal,
  to compare a result of the signal analysis with an expected value stored in a memory of the controller, and
  if no match is determined between the signal analysis result and the expected value, to prevent, at least partially, further operation of at least part of the device,
 wherein the electrical circuit is configured as a passive network having a characteristic transfer function and comprises at least one inductive element comprising a conducting wire looped into a coil around a cut-out in the circuit board which, in an installed condition, is penetrated by a ferromagnetic rod or by a ferromagnetic fastening pin, whereby the inductance of the inductive element in the installed condition differs from the inductance of the inductive element in the uninstalled condition.

2. The electronic device as claimed in claim 1, wherein the test signal is at least one of a pulsed signal, an alternating current signal with a predetermined frequency and an alternating current signal with a sequence of predetermined frequencies.

3. The electronic device as claimed in claim 1, wherein the passive network further comprises at least one capacitive element comprising a conductor surface which, in the installed condition, forms a capacitor with a corresponding, device-side conductor surface which, in the installed condition, is connected via a contact element to the electrical circuit, whereby the capacitance of the capacitive element in the installed condition differs from the capacitance of the capacitive element in the uninstalled condition.

4. The electronic device as claimed in claim 1, wherein the electrical circuit comprises at least two separate partial circuits which, in the installed condition, are connected to electrically conduct by interaction with at least one of: at least one device component and at least one installation component.

5. The electronic device as claimed in claim 1, wherein the characteristic transfer function is specific to a source of the electronic device.

6. The electronic device as claimed in claim 1, wherein the characteristic transfer function is unique to the circuit board.

7. The electronic device as claimed in claim 1, wherein the controller is configured to deactivate at least a predetermined operation of the electrical circuit.

8. The electronic device as claimed in claim 1, wherein the controller is configured to block activation of the electrical circuit.

9. A method for testing a circuit board which comprises a set of input contacts, a set of output contacts and an electrical circuit connected between the input contacts and the output contacts, comprising:

a) applying a predetermined test signal to the set of input contacts, b) tapping off a response signal at the set of output contacts, c) analyzing the response signal, wherein a controller performs said applying, said tapping and said analyzing at least once during operation of an electronic device which comprises the circuit board, d) comparing a result of the signal analysis with an expected value, and e) if said comparing produces no match between the signal analysis result and the expected value, preventing, at least partially, further operation of at least part of the electronic device, wherein the electrical circuit is configured as a passive network having a characteristic transfer function and comprises at least one inductive element comprising a conducting wire looped into a coil around a cut-out in the circuit board which, in an installed condition, is penetrated by a ferromagnetic rod or by a ferromagnetic fastening pin, whereby the inductance of the inductive element in the installed condition differs from the inductance of the inductive element in the uninstalled condition.

* * * * *